United States Patent [19]
Haase

[11] Patent Number: 5,505,358
[45] Date of Patent: Apr. 9, 1996

[54] AUTO TRUNK ORGANIZER

[76] Inventor: Charles P. Haase, 4209 Kent Ave., Metairie, La. 70006

[21] Appl. No.: 324,719

[22] Filed: Oct. 18, 1994

[51] Int. Cl.$^6$ .............................. B60R 7/00; B60R 7/02
[52] U.S. Cl. .................. 224/539; 224/277; 224/404; 224/901; 296/37.8; 296/37.1
[58] Field of Search ............................. 224/275, 277, 224/403, 404, 539, 925; 296/37.1, 37.8, 37.15; 312/34.1, 34.18, 9.1, 183, 237, 901

[56] References Cited

U.S. PATENT DOCUMENTS

| | | | |
|---|---|---|---|
| D. 312,604 | 12/1990 | Barnes et al. | D12/155 |
| D. 324,303 | 3/1992 | Miller | D3/40 |
| 884,428 | 4/1908 | Strong | 296/37.1 |
| 1,333,246 | 3/1970 | Colburn | 224/277 |
| 1,433,810 | 10/1922 | Gibbons | 296/37.1 |
| 1,927,922 | 9/1933 | Crum | 296/37.1 |
| 2,744,667 | 5/1956 | Maloney | 224/275 |
| 3,517,978 | 6/1968 | Hudson | 312/235 |
| 4,274,567 | 6/1981 | Sawyer | 224/277 |
| 4,832,242 | 5/1989 | Leek | 224/311 |
| 4,966,318 | 10/1990 | Dutka | 224/277 |
| 5,054,864 | 10/1991 | Cesens | 312/328 |
| 5,215,205 | 6/1993 | Behlman | 224/901 |

Primary Examiner—Henry J. Recla
Assistant Examiner—Charles R. Eloshway
Attorney, Agent, or Firm—Joseph N. Breaux

[57] ABSTRACT

An auto trunk organizer comprising a cabinet member, a storage member, and mechanism for detachably securing the storage member to the cabinet member. The cabinet member has an outer housing enclosing an interior cavity, a plurality of draw members having draw latching mechanisms, and at least one pivoting door member having a latching mechanism. The storage member is portable and includes multiple, separate compartments suitable for storing documents. The storage member preferably includes an accordion type file folder. The attachment mechanism is connected between the cabinet member and the storage member. The attachment mechanism allows the storage member to be detachably secured to the cabinet member. Any attachment mechanism that will allow the storage member to be detachably secured to the cabinet member may be used. The attachment mechanism preferably includes either, or both, a hook-and-pile type fastener or a snap type fastener. The cabinet member preferably further includes three protruding sections extending from a sidewall of the outer housing, the protruding sections forming a recess into which the storage member may be at least partially disposed. The cabinet member may also include a securing mechanism, in connection with a bottom exterior portion of the outer housing, for securing the cabinet member to an auto trunk in a manner such that the cabinet member remains in an upright position during normal vehicle use.

4 Claims, 3 Drawing Sheets

AUTO TRUNK ORGANIZER

TECHNICAL FIELD

The present invention relates to devices for organizing and storing items within an automotive vehicle and more particularly to devices for organizing and storing items within an automotive vehicle that include a mechanism for detachably securing at least one portable storage compartment.

BACKGROUND ART

It is a constant problem for salesmen and the like to maintain the numerous records and sales literature required to perform their jobs in an organized and readily accessible manner while on the road. Disorganized records and sales literature can lead to embarrassing delays, as the auto is searched for the proper form or sales literature, and to lost sales when the required item is not found. It would be a benefit, therefore, to have an automotive organizing device for organizing and storing sales records and literature that would allow rapid access to such records and literature. It would be a further benefit to have such an organizing device that allowed groups of sales literature and records to be organized within a readily detachable carrying device that could be detached and brought with the individual on sales calls.

Various attempts have been made in the past to help alleviate this problem. However, none of these attempts has provided an automobile organizer which provides the aforementioned benefits.

U.S. Pat. No. 3,517,978 to Hudson, issued Jun. 17, 1968, provides a vehicle file cabinet for use in an automobile consisting of a receptacle, removably seated partially on the floor of the auto, over the drive shaft, and partially on the front seat, having an inclined, hinged top surface for use as a desk and removable interior dividers and/or shelves arranged as desired.

U.S. Pat. No. 4,832,242 to Leek, issued May 23, 1989, provides a portable automobile trunk organizer for storing, organizing and transporting jumper cables, first-aid kit, flares, motor oil, other automotive fluids, flashlights, and other miscellaneous tools.

U.S. Pat. No. 5,054,864 to Cesens, issued Oct. 8, 1991, provides a trunk storage apparatus having an air-tight cabinet for storing gasoline and spring clips for securing and storing signal flares.

None of these devices has addressed the problem of conveniently organizing groups of documents within a storage compartment which may be detached from the organizer device and carried on sales calls.

GENERAL SUMMARY DISCUSSION OF INVENTION

It is thus an object of the invention to provide an automotive trunk organizing device for organizing and storing sales records and literature which allows rapid access to such records and literature.

It is a further object of the invention to provide an automotive trunk organizing device which allows groups of sales literature and records to be organized within a readily detachable carrying device that may be detached and brought with the individual on sales calls.

Accordingly, an auto trunk organizer is provided. The auto trunk organizer comprises a cabinet member, a storage member, and mechanism for detachably securing the storage member to the cabinet member.

The cabinet member has an outer housing enclosing an interior cavity, a plurality of draw members having draw latching mechanisms, and at least one pivoting door member having a latching mechanism.

The outer housing has an equal number of draw openings and at least one door opening therethrough into the interior cavity. The plurality of draw members are slidably mounted to the cabinet member in a manner such that each the draw member is selectively positionable at least partially through one of the draw openings into and out of the interior cavity. Each of the draw members includes a draw latching mechanism for latching the draw member to the cabinet member when the draw member is positioned into the interior cavity to the draw member's full extent.

The pivoting door member is connected in a pivoting relationship with the outer housing in a manner to selectively allow access into the interior cavity through one of the door openings. The door member includes a door latching mechanism for latching the door member to the cabinet member when the door member is pivoted into a position which blocks access into the interior cavity through the door opening.

The cabinet member preferably further includes three protruding sections extending from a sidewall of the outer housing, the protruding sections forming a recess into which the storage member may be at least partially disposed. The cabinet member may also include a securing mechanism, in connection with a bottom exterior portion of the outer housing, for securing the cabinet member to an auto trunk in a manner such that the cabinet member remains in an upright position during normal vehicle use. In addition, it is preferred to construct the outer housing from a material having thermal insulating properties greater than one-sixteenth inch thick steel sheeting.

The storage member is portable and includes multiple, separate compartments suitable for storing documents. The storage member preferably includes an accordion type file folder.

The attachment mechanism is connected between the cabinet member and the storage member. The attachment mechanism allows the storage member to be detachably secured to the cabinet member. Any attachment mechanism that will allow the storage member to be detachably secured to the cabinet member may be used. The attachment mechanism preferably includes either, or both, a hook-and-pile type fastener or a snap type fastener.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
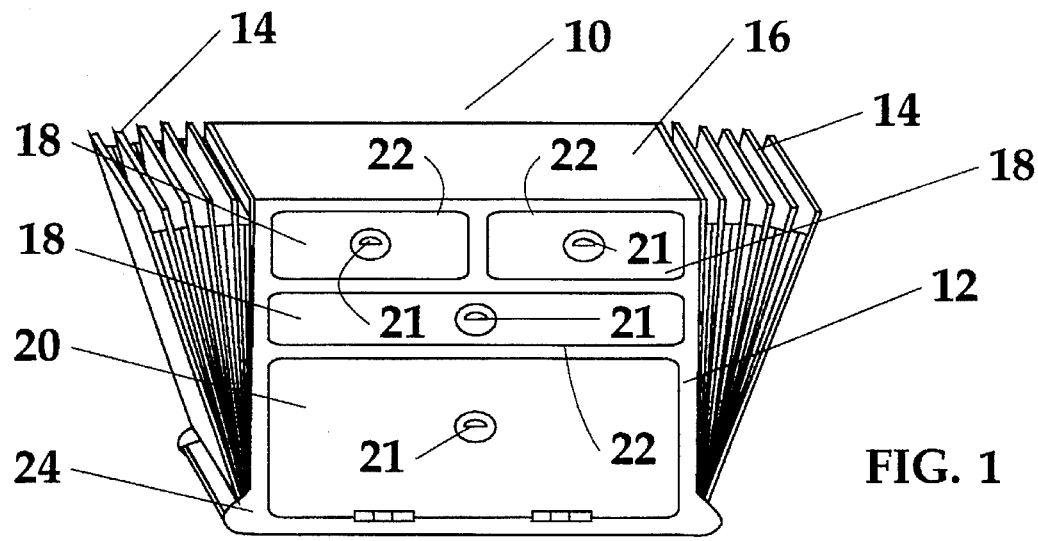
FIG. 1 is a perspective view of a preferred embodiment of the auto trunk organizer of the present invention.

FIG. 1 shows an exemplary embodiment of the auto trunk organizer 10 of the present invention. Trunk organizer 10 includes a cabinet member 12, two storage members 14, and a mechanism (not shown in FIG. 1) for detachably securing the storage member 14 to the cabinet member 12.

Cabinet member 12 is constructed from foam insulated plastic which provides thermal insulation for items stored within cabinet member 12. Cabinet member 12 measures about nineteen inches in height, thirty inches in width, and seventeen inches in depth. Cabinet member 12 has an outer housing 16 enclosing an interior cavity (not shown), three draw members 18 having draw latching mechanisms (Shown in FIG. 1A), and a pivoting door member 20 having a latching mechanism (same as latching mechanism shown in FIG. 1A).

Figure 1A:
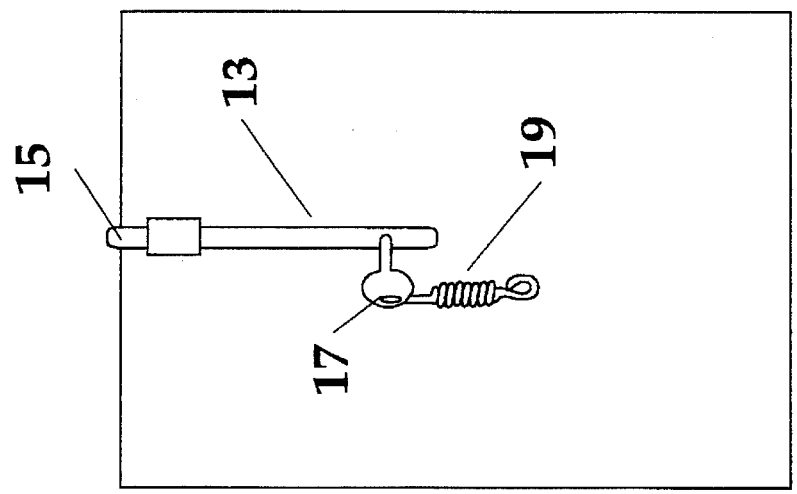
FIG. 1A is a schematic view of a preferred latching mechanism.

Outer housing 16 has three draw openings 22 and one door opening 24 therethrough into the interior cavity. Draw members 18 are slidably mounted to the cabinet member 12 and are each selectively positionable at least partially through its respective draw opening 22 into and out of the interior cavity. Each of draw members 18 includes a draw latching mechanism 13 (shown in FIG. 1A) for latching the draw member 18 to the cabinet member 12 when the draw member 18 is positioned into the interior cavity to the draw member's full extent. Any biased latching mechanism may be used. As shown in FIG. 1A, latching mechanism 13 has an extended edge 15 for engaging the interior lip of the door opening when the draw is in the fully closed position. Edge 15 is disengaged from the interior lip by rotating a knob 21 (see FIG. 1) attached to rotor 17. When the knob is released with the draw in the fully closed position, spring 19 causes edge 15 to move forward, engaging the interior lip of the door opening and securing the draw member in the closed position.

Figure 2:
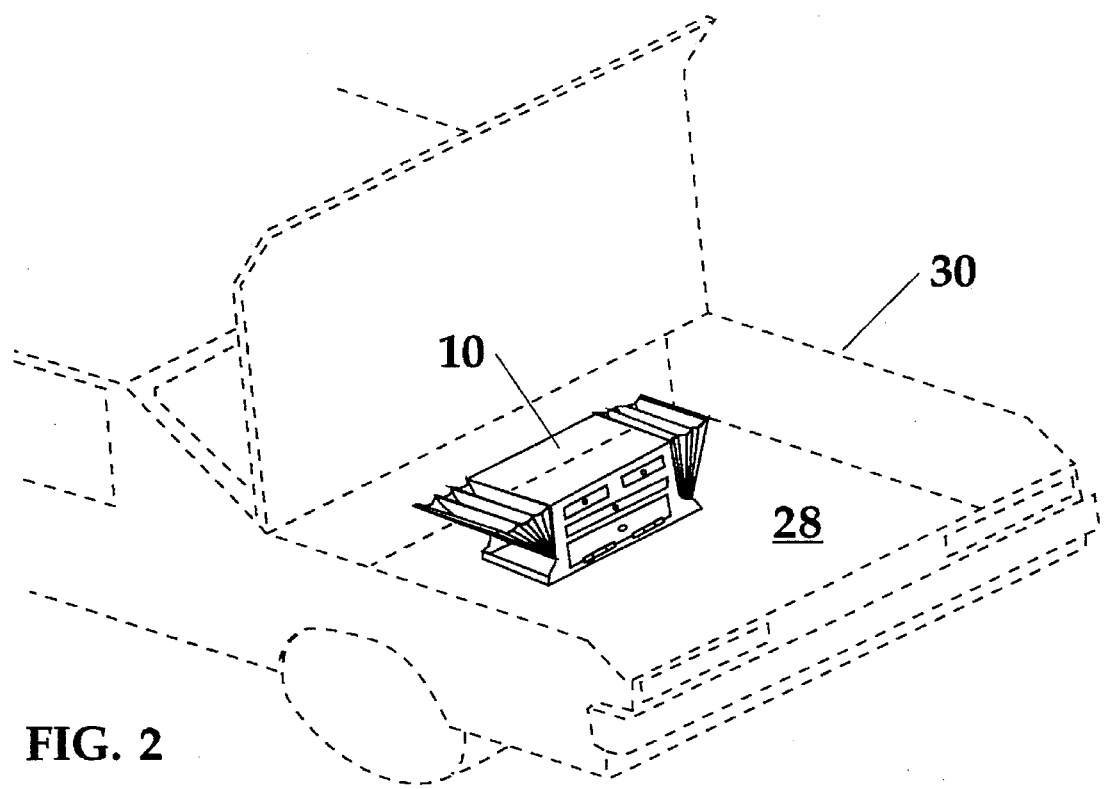
FIG. 2 is a perspective view showing the auto trunk organizer of FIG. 1 in-situ in the trunk of a typical automobile.

With reference again to FIG. 1, pivoting door member 20 is connected in a pivoting relationship with the outer housing 16 to selectively allow access into the interior cavity through door opening 24. Door member 20 includes a door latching mechanism for latching door member 20 to the cabinet member 12 when door member 20 is pivoted into a position which blocks access into the interior cavity through door opening 24. The door mechanism is identical to the draw latching mechanism 13 shown in FIG. 1A and previously described. FIG. 2 shows trunk organizer 10 installed within the trunk compartment 28 of a typical automobile 30.

Figure 3:
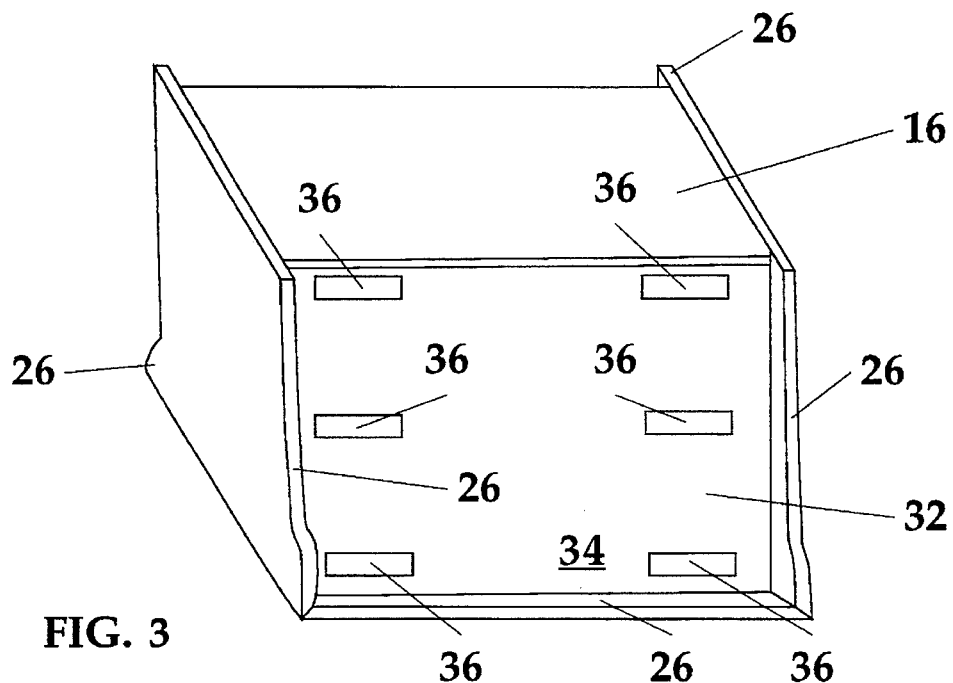
FIG. 3 is a side view of the cabinet member of the embodiment shown in FIG. 1 showing the recess for at least partially receiving the storage member.

With reference to FIG. 3, Cabinet member 12 also includes three protruding sections 26 extending from each sidewall 32 of the outer housing 16. The protruding sections 26 form a recess 34 into which storage member 14 may be at least partially disposed. Each sidewall 32 includes six (6) attachment mechanisms 36, shown generically in FIG. 3 as a "black box" structure. In use, attachment mechanisms 36 cooperate with mating mechanisms 42 on the sidewall of storage member 14. The attachment mechanisms can include hook-and-loop fasteners or snap fasteners.

Figure 4A:
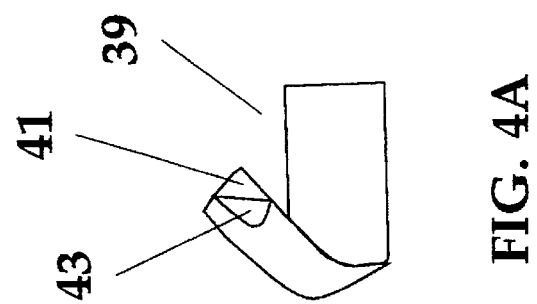
FIG. 4A is a perspective view of a representative pile section used to secure the auto trunk organizer within the trunk of an automobile.
Figure 4:
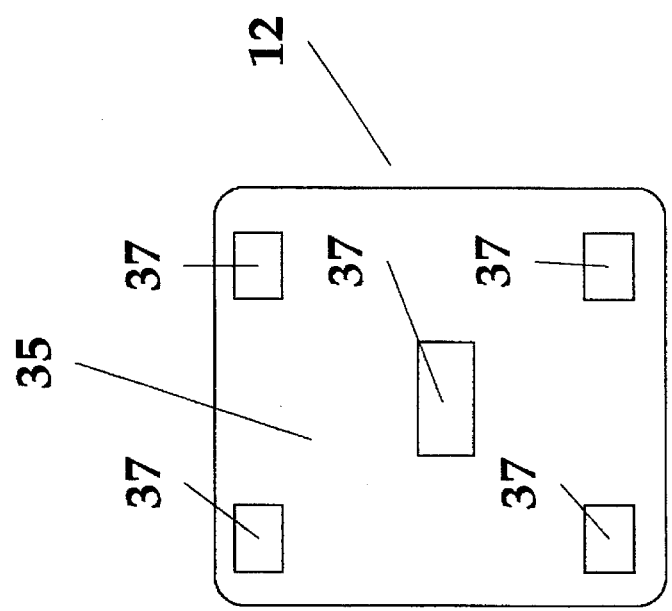
FIG. 4 is an underside view of the cabinet member of the embodiment shown in FIG. 1 showing the securing mechanism for securing the cabinet member within the trunk.

FIG. 4 shows the underside 35 of cabinet member 12. Underside 35 has five (5) hook sections 37 of hook material from a hook-and-pile type fastener glued thereto. Five pile sections 39 (one shown in FIG. 4A) are provided with trunk organizer 10. Each pile section 39 has a self-adhesive back surface 41 covered by a non-stick tape 43.

Figure 5:
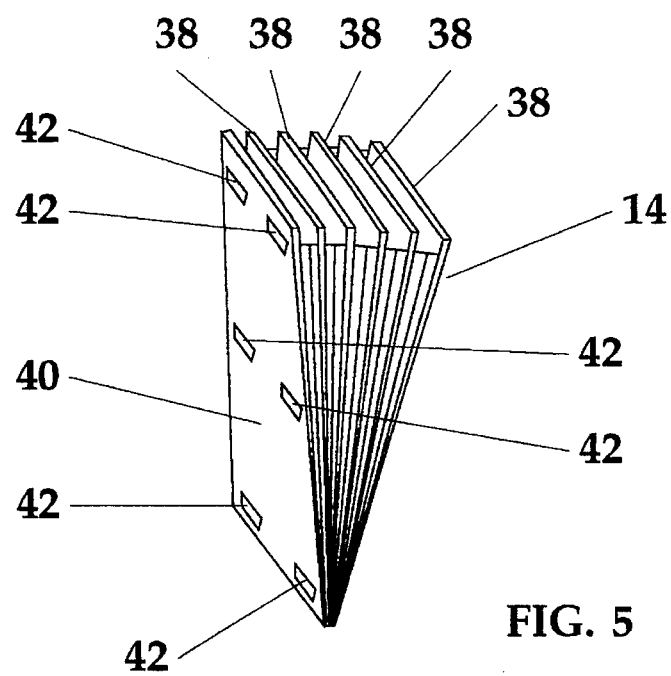
FIG. 5 is a perspective view of the storage member of the embodiment shown in FIG. 1 in isolation.

As shown in FIG. 5, storage member 14 is a conventional, accordion-type file folder having multiple, separate compartments 38 suitable for storing documents. One sidewall 40 has six (6) attachment mechanisms 42 positioned to coincide with the placement of attachment mechanisms 36.

Installation of auto trunk organizer 10 is easy and convenient. Installation is as follows: each pile section 39 is connected to a compatible hook section 37, the non-stick tape 43 is removed, and trunk organizer 10 is placed into the desired position within the trunk compartment of the desired automobile. This is convenient manner for ensuring that pile sections 39 are positioned to coincide with the placement of hook sections 37.

Use of trunk organizer 10 is simple and convenient. Draw members 18 provide storage for business supplies such as staplers, paper clips, pens, etc. Door member 20 allows access into the internal cavity of outer housing 16 for storage of items that are too large to be stored in one of the draw members 18. Storage member 14 provides convenient storage for documents such as sales forms and literature. In use, storage member 14 may be either secured to sidewall 32 of cabinet member 12 or detached and carried as a portable file folder.

It can be seen from the preceding description that an automobile trunk organizer which allows rapid access to records and literature and which allows groups of sales literature and records to be organized within a readily detachable carrying device that may be detached and brought with the individual on sales calls has been provided.

It is noted that the embodiment of the auto trunk organizer described herein in detail for exemplary purposes is of course subject to many different variations in structure, design, application and methodology. For example, the top of the cabinet may be contoured to coincides with the slope of the trunk lid in order to optimise the size of the trunk organizer and allow for full trunk lid function; and constructed of a material having a hardness which will allow the top of the cabinet to function as a writing surface. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An auto trunk organizer comprising:

a cabinet member having an outer housing enclosing an interior cavity, said outer housing having a plurality of draw openings and at least one door opening therethrough into said interior cavity, a plurality of draw members slidably mounted to said cabinet member in a manner such that each said draw member is selectively positionable at least partially through one of said draw openings into and out of said interior cavity, each of said draw members including a draw latching means for latching said draw member to said cabinet member when said draw member is positioned into said interior cavity to said draw member's full extent, at least one pivoting door member in pivoting relationship with said outer housing in a manner to selectively allow access into said interior cavity through one of said door openings, said door member including door latching means for latching said door member to said cabinet member when said door member is pivoted into a position which blocks access into said interior cavity through said door opening, at least one portable, multi-compartment storage member having a plurality of separate compartments suitable for storing documents, said storage member including an accordion type file folder; and attachment means, connected between said cabinet member and said storage member, for detachably securing said storage member to said cabinet member;

said cabinet member further including three protruding sections extending from a sidewall of said outer housing, said protruding sections forming a recess into which said storage member may be at least partially disposed.

2. The auto trunk organizer of claim 1, wherein:

said attachment means includes a hook-and-pile type fastener.

3. The auto trunk organizer of claim 1 wherein:

said attachment means includes a snap type fastener.

4. The auto trunk organizer of claim 1 wherein:

said cabinet member further includes securing means, in connection with a bottom exterior portion of said outer housing, for securing said cabinet member to an auto trunk in a manner such that said cabinet member remains in an upright position during normal vehicle use.

\* \* \* \* \*